(12) United States Patent
Wan et al.

(10) Patent No.: US 8,902,752 B2
(45) Date of Patent: Dec. 2, 2014

(54) CELL PROCESSING METHOD, SOURCE LINE CARD, AND NETWORK CARD IN SWITCHING NETWORK

(75) Inventors: Lam Wan, Shenzhen (CN); Guigeng Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 103 days.

(21) Appl. No.: 13/401,576

(22) Filed: Feb. 21, 2012

(65) Prior Publication Data

US 2012/0213076 A1 Aug. 23, 2012

(30) Foreign Application Priority Data

Feb. 21, 2011 (CN) .......................... 2011 1 0042705

(51) Int. Cl.
| | | |
|---|---|---|
| H04L 12/801 | (2013.01) | |
| H04J 3/06 | (2006.01) | |
| H04J 3/22 | (2006.01) | |
| H04L 12/56 | (2006.01) | |
| H04J 1/16 | (2006.01) | |
| H04L 12/939 | (2013.01) | |
| H04L 12/935 | (2013.01) | |
| H04L 12/931 | (2013.01) | |

(52) U.S. Cl.
CPC .............. H04L 49/552 (2013.01); H04L 49/30 (2013.01); *H04L 49/40* (2013.01)
USPC ........... 370/235; 370/389; 370/392; 370/465; 370/229; 370/230; 370/471; 370/472

(58) Field of Classification Search
CPC ............ H04L 49/1515; H04L 49/1569; H04L 49/153; H04L 49/1523; H04L 67/108; H04L 67/166; H04L 1/1678; H04L 1/1671; H04L 1/1607; H04L 12/2684; H04L 43/106; H04L 47/2483; H04L 47/22; H04L 47/2408; H04L 47/12; H04L 47/10; H04L 41/0896; H04L 1/0002
USPC ................. 370/387–394, 229–235, 465–468, 370/471–472
See application file for complete search history.

(56) References Cited

U.S. PATENT DOCUMENTS 5,404,352 A * 4/1995 Pauwels et al. ................ 370/390
5,859,835 A * 1/1999 Varma et al. .................. 370/229

(Continued)

FOREIGN PATENT DOCUMENTS

| CN | 1859263 A | 11/2006 |
|---|---|---|
| CN | 101599824 A | 12/2009 |

OTHER PUBLICATIONS

2nd Office Action in corresponding Chinese Patent Application No. 201110042705.6 (Dec. 13, 2012).

(Continued)

*Primary Examiner* — Wutchung Chu
(74) *Attorney, Agent, or Firm* — Leydig, Voit & Mayer, Ltd.

(57) ABSTRACT

The present invention provides a source line card. The source line card segments a data packet in a data stream into cells first, then inserts Time Stamps and Flow Identifications into cell headers, and sends the marked cell headers and cell payloads to the network card. The network card sends the cells to a destination line card or a lower-level network card in sequence according to the Time Stamps and the Flow Identifications, where the Time Stamps and the Flow Identifications are in the cell headers of the received cells. By inserting the Time Stamps and the Flow Identifications into the cell headers, it is ensured that an output sequence and an input sequence of cells that belong to a stream in the switching network are the same, so that the destination line card may reassembles a data packet easily according to a sequence in which the cells are received.

8 Claims, 5 Drawing Sheets

(56) References Cited

U.S. PATENT DOCUMENTS

| | | | |
|---|---|---|---|
| 6,081,507 A * | 6/2000 | Chao et al. | 370/235 |
| 6,366,959 B1 * | 4/2002 | Sidhu et al. | 709/231 |
| 7,013,348 B1 * | 3/2006 | Carson et al. | 709/238 |
| 7,079,485 B1 * | 7/2006 | Lau et al. | 370/229 |
| 7,095,744 B2 | 8/2006 | Iny | |
| 7,113,484 B1 * | 9/2006 | Chapman et al. | 370/252 |
| 7,583,664 B2 * | 9/2009 | Ho et al. | 370/386 |
| 7,697,570 B2 * | 4/2010 | Li et al. | 370/498 |
| 7,715,377 B2 * | 5/2010 | Mick et al. | 370/371 |
| 7,797,464 B2 * | 9/2010 | Mes et al. | 710/30 |
| 2002/0145977 A1 * | 10/2002 | Delattre et al. | 370/235.1 |
| 2003/0091035 A1 * | 5/2003 | Roy et al. | 370/353 |
| 2004/0042466 A1 * | 3/2004 | Tatem et al. | 370/395.62 |
| 2004/0085897 A1 * | 5/2004 | Jacobi et al. | 370/229 |
| 2004/0120351 A1 * | 6/2004 | Li et al. | 370/498 |
| 2008/0075069 A1 * | 3/2008 | Fourcand | 370/357 |
| 2008/0075120 A1 * | 3/2008 | Fourcand | 370/503 |
| 2008/0101394 A1 * | 5/2008 | Noumi et al. | 370/401 |
| 2010/0135314 A1 * | 6/2010 | Fourcand | 370/419 |
| 2010/0272123 A1 * | 10/2010 | Peterson | 370/474 |

OTHER PUBLICATIONS

1st Office Action in corresponding European Patent Application No. 12001139.0 (Jul. 11, 2013).
Extended European Search Report in corresponding European Patent Application No. 12001139.0 (Aug. 16, 2012).
Schulzrinne et al., "RTP: A Transport Protocol for Real-Time Applications," Network Working Group Standards Track, Jul. 2003, The Internet Society, Geneva, Switzerland.
1st Office Action in corresponding Chinese Patent Application No. 201110042705.6 (Apr. 17, 2012).
3rd Office Action in corresponding Chinese Patent Application No. 201110042705.6 (Apr. 3, 2013).

* cited by examiner

| 20-bit Time Stamp | 12-bit Flow Identification | Another field | Cell payload |
|---|---|---|---|

FIG. 4 (1)

| 20-bit Time Stamp | 12-bit Flow Identification | 7-bit Sequence Number | Cell Size | Another field | Cell payload |
|---|---|---|---|---|---|

FIG. 4 (2)

CELL PROCESSING METHOD, SOURCE LINE CARD, AND NETWORK CARD IN SWITCHING NETWORK

CROSS-REFERENCE TO RELATED APPLICATION

This application claims priority to Chinese Patent Application No. 201110042705.6, filed on Feb. 21, 2011, which is hereby incorporated by reference in its entirety.

FIELD OF THE INVENTION

The present invention relates to the field of communication, and in particular, to a cell processing method, a source line card, and a network card in a switching network.

BACKGROUND OF THE INVENTION

A switching network includes a core module in a router and other data switching devices, and performs switching on a data packet or cell between multiple ports, that is, switches a data packet or cell, where the data packet or cell arrives at an input port, to a corresponding output port. A basic requirement on the switching network is that switched data packets and cells are required to keep an original order. As shown in FIG. 1, in a K-plane multi-level switching network in the prior art, normally a cell may arrive at a destination port through multiple paths, but it is very difficult for a time delay of each of the paths to be completely the same, which incurs an out-of-order phenomenon when cells that belong to a stream (from a same input port to a same output port) arrive at the destination port. The input port may be a source line card, and a component on the source line card, where the component on the source line card is directly related to the present invention, is an FIC (Fabric Interface Chip, switching network interface chip). The FIC performs processing on a data packet together with a switching network chip. An upstream FIC generally receives a slice of a variable-length data packet from a network side, and manages a virtual output queue (VOQ). The FIC may also include TM (Traffic Management, a traffic management function). An output port of the upstream FIC is a network card, and the network card includes mutually-independent switching chips or switching units. By taking a Clos interconnected multi-level switching network as an example, a switching chip may be formed by three levels, that is, switching units of three levels S1, S2, and S3. As shown in FIG. 2, a cell C1 departs from an FIC1, passes through an S1/3(2) and an S2(2), returns to an S1/3(2), and arrives at an FIC2; a cell C2 departs from the FIC1, passes through an S1/3(1), an S2(1), the S2(2), and the S1/3(2), and arrives at the FIC2; and a cell C3 departs from the FIC2, passes through the S1/3(1), the S2(2), the S2(1), and the S1/3(1), and arrives at the FIC1. If the cell C2 is sent first, and then the cell C1 and the cell C3 are sent at the same time, the cells C1 and C3 which are sent later may arrive at the S2(2) earlier than the cell C2 which is sent earlier, or the cells C1 and C3 which are sent later and the cell C2 which is sent earlier may arrive at the S2(2) at the same time, so that in this case an out-of-order problem occurs at the S2(2).

SUMMARY OF THE INVENTION

Embodiments of the present invention provide a cell processing method, a source line card, and a network card in a switching network, so as to ensure that an output sequence and an input sequence of cells that belong to a stream are the same, so that a destination line card may reassembles a data packet easily according to a sequence in which the cells are received.

An embodiment of the present invention provides a cell processing method in a switching network, where the method includes:

segmenting a data packet in a data stream into one or more cells of a same length, or segmenting the data packet in the data stream into one or more cells of different lengths; and inserting a Time Stamp and a Flow Identification into a cell header, and sending the marked cell header and a cell payload to a network card, where the Time Stamp is used to mark local time when a source line card sends a cell, and the Flow Identification is used to mark different data streams.

An embodiment of the present invention provides a source line card in a switching network, where the source line card includes:

a segmenting unit, configured to segment a data packet in a data stream into one or more cells of a same length, or segment the data packet in the data stream into one or more cells of different lengths;

a marking unit, configured to insert a Time Stamp and a Flow Identification into a cell header after segmentation of the segmenting unit, where the Time Stamp is used to mark local time when a source line card sends a cell, and the Flow Identification is used to mark different data streams; and a sending unit, configured to send the cell header marked by the marking unit and a cell payload to a network card.

An embodiment of the present invention provides a cell processing method in a switching network, where the method includes:

receiving cells sent by a source line card or an upper-level network card, where the cells include cell headers and cell payloads; and sending the cells to a destination line card or a lower-level network card in sequence according to Time Stamps and Flow Identifications, where the Time Stamps and Flow Identifications are in the cell headers of the received cells, the Time Stamps are used to mark local time when the source line card sends the cells, and the Flow Identifications are used to mark different data streams; specifically, the cells are sorted according to the Time Stamps, and the cells are sent to the destination line card or the lower-level network card in sequence according to the Flow Identifications in the cell headers if the Time Stamps are the same.

An embodiment of the present invention provides a network card in a switching network, where the network card includes:

a receiving module, configured to receive cells sent by a source line card, where the cells include cell headers and cell payloads; and a sorting and sending module, configured to send the cells to a destination line card or a lower-level network card in sequence according to Time Stamps and Flow Identifications, where the time Stamps and Flow Identifications are in the cell headers received by the receiving module; specifically, the cells are sorted according to the Time Stamps, and the cells are sent to the destination line card or the lower-level network card in sequence according to the Flow Identifications in the cell headers if the Time Stamps are the same.

It can be seen from the technical solutions provided by the embodiments of the present invention that, the Time Stamp and the Flow Identification are inserted into the cell header, so as to ensure that an output sequence and an input sequence of cells that belong to the stream in the switching network are the same, so that a destination line card may reassembles a data packet easily according to a sequence in which the cells are received.

BRIEF DESCRIPTION OF THE DRAWINGS

To illustrate the technical solutions according to the embodiments of the present invention more clearly, accompanying drawings for describing the embodiments are introduced briefly in the following. Apparently, the accompanying drawings in the following description are only some embodiments of the present invention, and persons of ordinary skill in the art may further obtain other drawings from the accompanying drawings without creative efforts.

FIG. 4 (1) is a schematic structural allocation diagram of a cell according to an embodiment of the present invention;

FIG. 4 (2) is another schematic structural allocation diagram of a cell according to an embodiment of the present invention;

DETAILED DESCRIPTION OF THE EMBODIMENTS

The technical solutions according to the embodiments of the present invention are clearly and completely described in the following with reference to the accompanying drawings in the embodiments of the present invention. Obviously, the embodiments to be described are only part of rather than all of the embodiments of the present invention. All other embodiments obtained by persons of ordinary skill in the art based on the embodiments of the present invention without creative efforts shall fall within the protection scope of the present invention.

Figure 3:
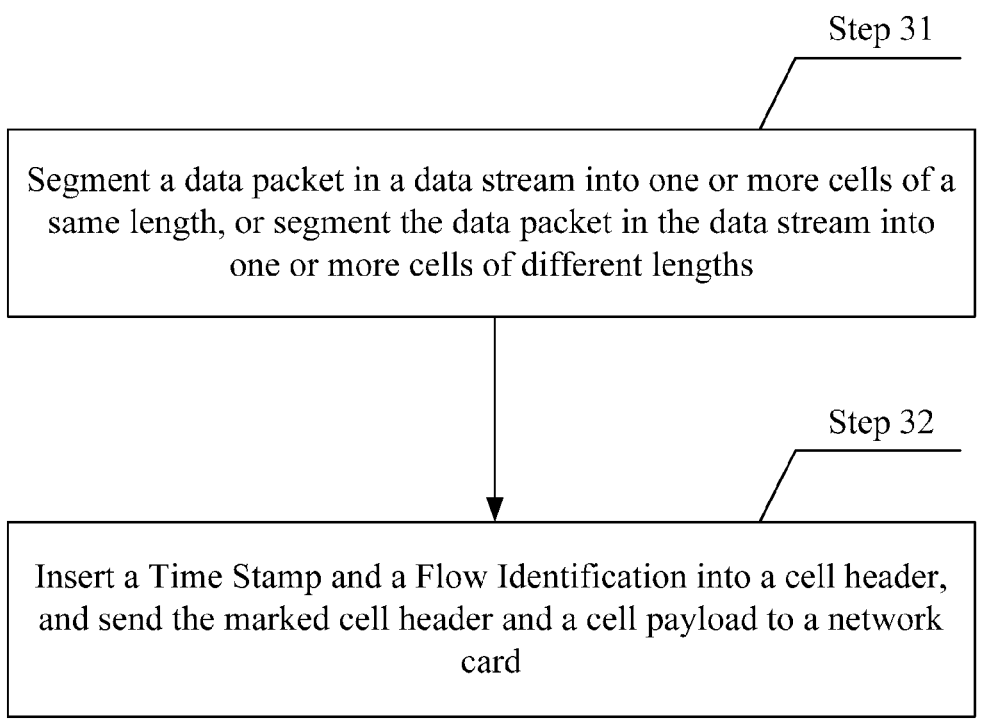
FIG. 3 is a schematic flow chart of a cell processing method in a switching network according to an embodiment of the present invention.

An embodiment of the present invention provides a cell processing method in a switching network. As shown in FIG. 3, the method includes:

Step 31: Segment a data packet in a data stream into one or more cells of a same length, or segment the data packet in the data stream into one or more cells of different lengths.

Specifically, for example, if the size of a data packet is 129 bytes, the data packet may be segmented into one 64-byte cell and one 65-byte cell; for example, if the size of a data packet is 256 bytes, the data packet may be segmented into four cells of the same length; for example, if the size of a data packet is 257 bytes, the data packet may be segmented into a 64-byte cell and a 193-byte cell, and may also be segmented into a 128-byte cell and a 129-byte cell, that is, be segmented into multiple cells of different lengths. If a data packet having the size of 257 bytes is segmented into multiple 64-byte cells of the same length, the data packet is required to be segmented into five cells, the last cell has only one byte being a valid byte, and the other 63 bytes are all filling bytes, so that in this case it is more reasonable that the data packet is segmented into multiple cells of different lengths.

Step 32: Insert a Time Stamp (Time Stamp, TS) and a Flow Identification (Flow Identification, FID) into a cell header, and send the marked cell header and a cell payload to a network card.

Specifically, the Time Stamp is used to mark local time when a source line card sends a cell. For example, in FIG. 2, if a Time Stamp of a cell C2 is 237, Time Stamps of a cell C1 and a cell C3 may be 240, and in this way, an S2(2) can distinguish the cell C2 through the Time stamp. The Flow Identification is used to mark different data streams. A data stream may generally include information of source and destination line cards of a data packet, and Quality of Service (QOS). Each data stream that is required to keep a sequence has a unique flow number in a system. In the embodiment of the present invention, a same Flow Identification indicates that source line cards of a data packet are the same and destination line cards of the data packet are also the same. For example, in FIG. 2, the source line card of the cell C1 is an FIC1, the destination line card of the cell C1 is an FIC2, the source line card of the cell C2 is the same as that of the cell C1, and the destination line card of the cell C2 is the same as that of the cell C1, so that the Flow Identification of the cell C1 is the same as that of the cell C2. The source line card of the cell C3 is the FIC2, and the destination line card of the cell C3 is the FIC1, so that the Flow Identification of the cell C3 is different from those of the cells C1 and C2, and in this way, the S2(2) can distinguish the cell C3 through the Flow Identification.

A structural allocation situation of a cell may be as shown in FIG. 4 (1). A bit allocation situation of the Time Stamp, the Flow Identification, another field, and the cell payload that are in the cell header is indicated in the figure, the numbers of the allocated bits may vary, and the figure is only an example taken for illustration.

Further, step 32 may further include: inserting a Sequence Number (Sequence Number, SN) in the cell header. The Sequence Number is a serial number of a cell in a same data packet, so as to ensure an order of cells in the same data packet. For example, a same data packet is segmented into four cells, so that Sequence Numbers are respectively marked as 1, 2, 3, and 4.

After step 32, the method may further include: further inserting a Cell Size (Cell Size, CS) in the cell header. Normally, the Cell Size is inserted into the cell header only when a data packet is segmented into one or more cells of different lengths. For example, if a 257-byte data packet is segmented into two cells, namely a 128-byte cell and a 129-byte cell, Cell Sizes, that is 128 bytes and 129 bytes, are inserted into cell headers of the two cells respectively.

A structural allocation situation of a cell is as shown in FIG. 4 (2). A bit allocation situation of the Time Stamp, the Flow Identification, the Sequence Number, the Cell Size, another field, and the cell payload that are in the cell header is indicated in the figure, the numbers of the allocated bits may vary, and the figure is only an example taken for illustration.

Before step 31, the method may further include step 30: updating local time according to time synchronization information carried in a received synchronization cell or data cell sent by a network card, so as to be synchronized to the network card with respect to time. The synchronization cell or the time synchronization information may include time information of the network card and delay information of a transmission path. The delay information of the transmission path may be calculated and obtained according to a line length between devices in the switching network and a processing delay of each switching unit, and may also be obtained by sending a path delay measurement cell. The path delay measurement cell saves a measured and obtained path delay in a corresponding switching network device.

Figure 5:
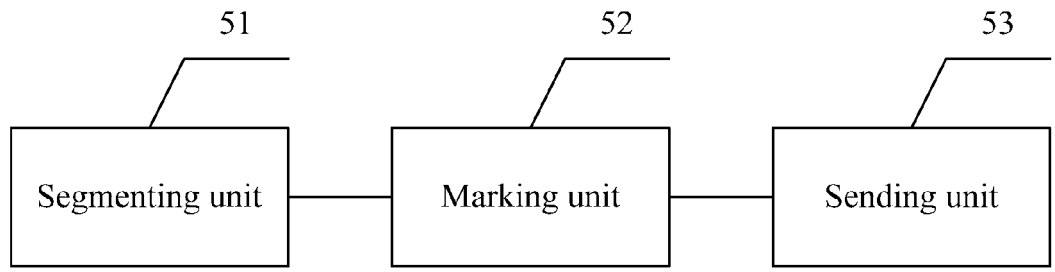
FIG. 5 is a schematic structural diagram of a source line card in a switching network according to an embodiment of the present invention.

An embodiment of the present invention further provides a source line card in a switching network. The source line card may be an FIC (Fabric Interface Chip, switching network interface chip) or a TM (Traffic Manager, traffic management chip), and as shown in FIG. 5 includes:

A segmenting unit 51 is configured to segment a data packet in a data stream into one or more cells of a same length, or segment the data packet in the data stream into one or more cells of different lengths.

Specifically, for example, if the size of a data packet is 256 bytes, the data packet may be segmented into four 64-byte cells, that is, be segmented into multiple cells of the same length; for example, if the size of a data packet is 257 bytes, the data packet may be segmented into a 64-byte cell and a 193-byte cell, and may also be segmented into a 128-byte cell and a 129-byte cell, that is, be segmented into multiple cells of different lengths. If a data packet having the size of 257 bytes is segmented into multiple 64-byte cells of the same length, the data packet is required to be segmented into five cells, the last cell has only one byte being a valid byte, and the other 63 bytes are all filling bytes, so that in this case it is more reasonable that the data packet is segmented into multiple cells of different lengths.

A marking unit 52 is configured to insert a Time Stamp and a Flow Identification into a cell header of the cell segmented by the segmenting unit 51.

Specifically, the Time Stamp is used to mark local time when a source line card sends a cell. For example, in FIG. 2, if a Time Stamp of a cell C2 is 237, Time Stamps of a cell C1 and a cell C3 may be 240, and in this way, an S2(2) can distinguish the cell C2 through the Time Stamp. The Flow Identification is used to mark different data streams. A data stream may generally include information of source and destination line cards of a data packet and Quality of Service (QOS). Each data stream that is required to keep a sequence has a unique flow number in a system. In the embodiment of the present invention, a same Flow Identification indicates that source line cards of a data packet are the same and destination line cards of the data packet are also the same. For example, in FIG. 2, the source line card of the cell C1 is an FIC1, the destination line card of the cell C1 is an FIC2, the source line card of the cell C2 is the same as that of the cell C1, and the destination line card of the cell C2 is the same as that of the cell C1, so that the Flow Identification of the cell C1 is the same as that of the cell C2. The source line card of the cell C3 is the FIC2, and the destination line card of the cell C3 is the FIC1, so that the Flow Identification of the cell C3 is different from those of the cells C1 and C2, and in this way, the S2(2) can distinguishing the cell C3 through the Flow Identification.

A structural allocation situation of a cell is as shown in FIG. 4 (1). A bit allocation situation of the Time Stamp, the Flow Identification, another field, and the cell payload that are in the cell header is indicated in the figure, the numbers of the allocated bits may vary, and the figure is only an example taken for illustration.

Optionally, the marking unit 52 may be further configured to insert a Sequence Number in the cell header of the cell segmented by the segmenting unit 51. A serial number is a Sequence Number of a cell in a same data packet, that is, a serial number of a cell having a same Time Stamp and a same Flow Identification. For example, a data packet is segmented into four cells, so that the Sequence Numbers are respectively marked as 1, 2, 3, and 4.

Optionally, the marking unit 52 may be further configured to insert a Cell Size in the cell header of the cell segmented by the segmenting unit 51. Normally, the Cell Size is inserted when the segmenting unit 51 segments the data packet into cells of different lengths. For example, if a 257-byte data packet is segmented into two cells, namely a 128-byte cell and a 129-byte cell, the Cell Sizes, that is 128 bytes and 129 bytes, are inserted into the cell headers of the two cells respectively.

A structural allocation situation of a cell is as shown in FIG. 4 (2). A bit allocation situation of the Time Stamp, the Flow Identification, the Sequence Number, the Cell Size, another field, and the cell payload that are in the cell header is indicated in the figure, the numbers of the allocated bits may vary, and the figure is only an example taken for illustration.

A sending unit 53 is configured to send the cell header marked by the marking unit 52 and the corresponding cell payload to a network card.

Figure 1:
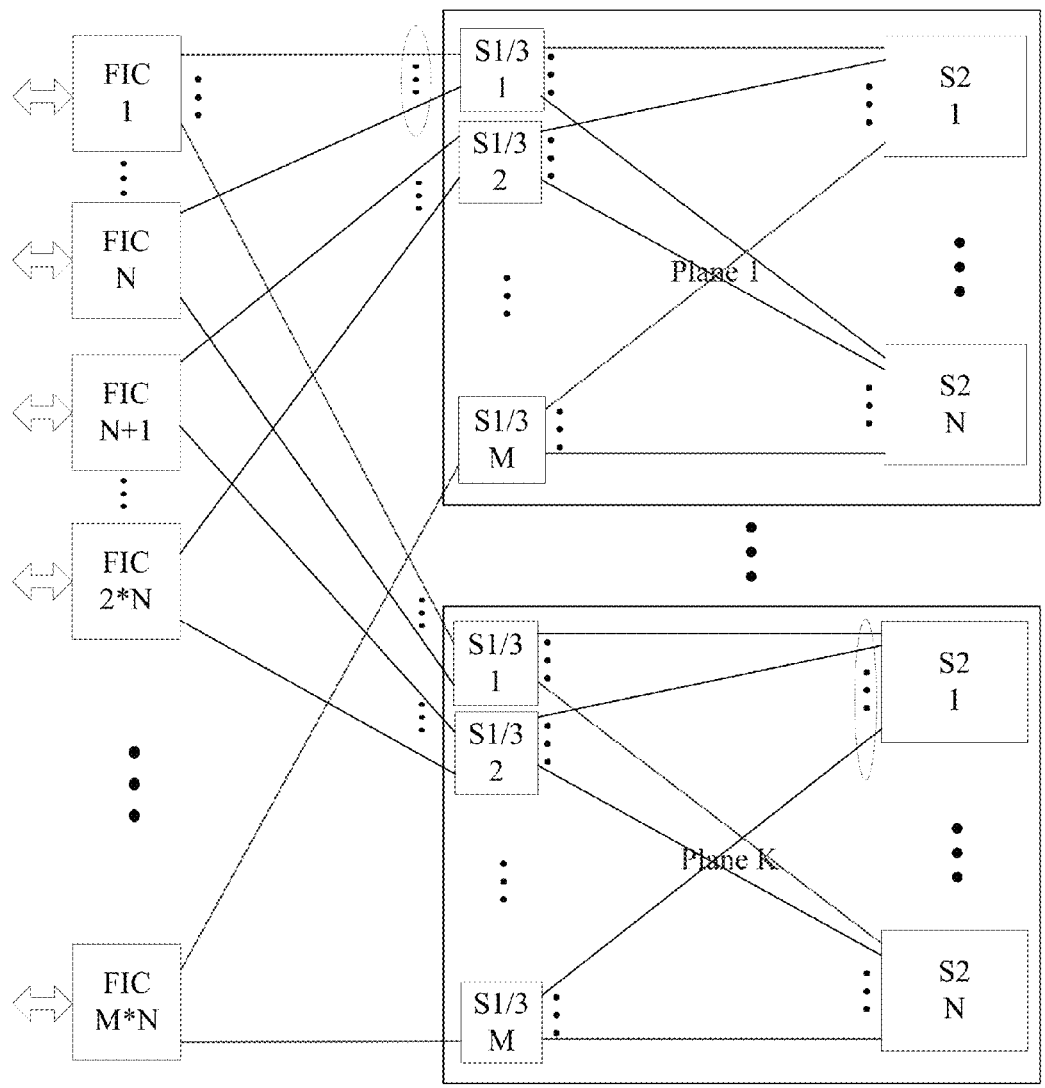
FIG. 1 is a schematic structural diagram of a K-plane switching network in the prior art, where K is a positive integer.
Figure 2:
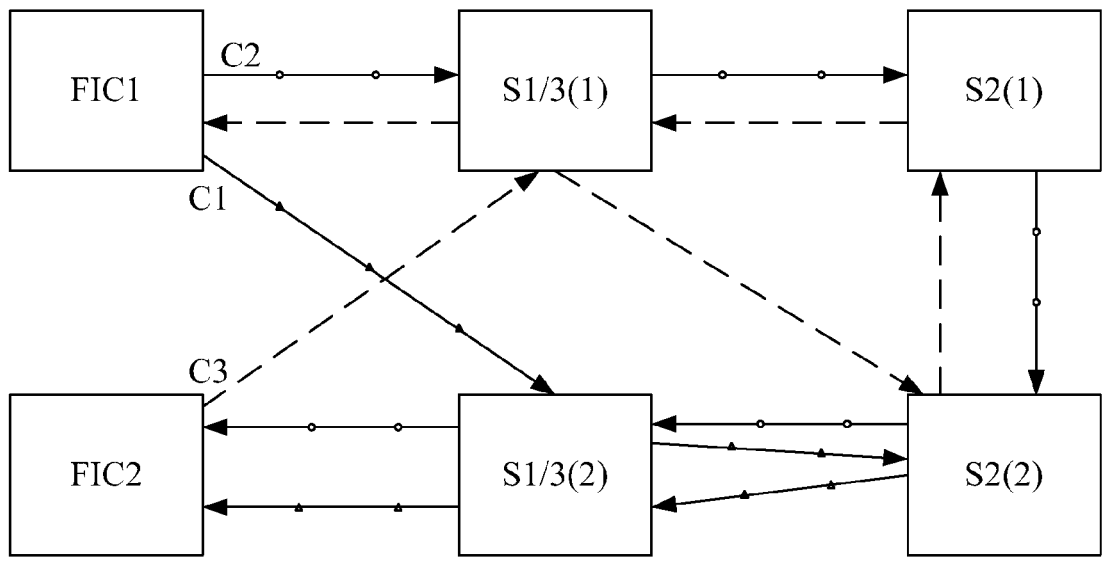
FIG. 2 is a schematic diagram of a switching network in the prior art, by taking an example that source line cards are an FIC1 and an FIC2, network cards are an S2(1) and an S2(2), and cells C1, C2, and C3 are transmitted, where "—•—" represents a transmission path of the cell C2, "—▲—" represents a transmission path of the cell C1, and "---" represents a transmission path of the cell C3.

Specifically, the network card may be a mutually-independent switching chip or switching unit, which may generally be divided into three levels, that is, as shown in FIG. 2, switching units of three levels S1, S2, and S3.

The source line card may further include a receiving unit, configured to receive time synchronization information carried in a received synchronization cell or data cell sent by a network card. The synchronization cell or the time synchronization information includes time information of the network card and delay information of a transmission path. The delay information of the transmission path may be calculated and obtained according to a line length between devices in the switching network, and may also be obtained by sending a path delay measurement cell. The path delay measurement cell saves a measured and obtained path delay in a corresponding switching network device.

A synchronization unit is configured to update local time according to the synchronization cell or time synchronization information, where the synchronization cell or time synchronization information is received by the receiving unit, so as to be synchronized to the network card with respect to time.

Figure 6:
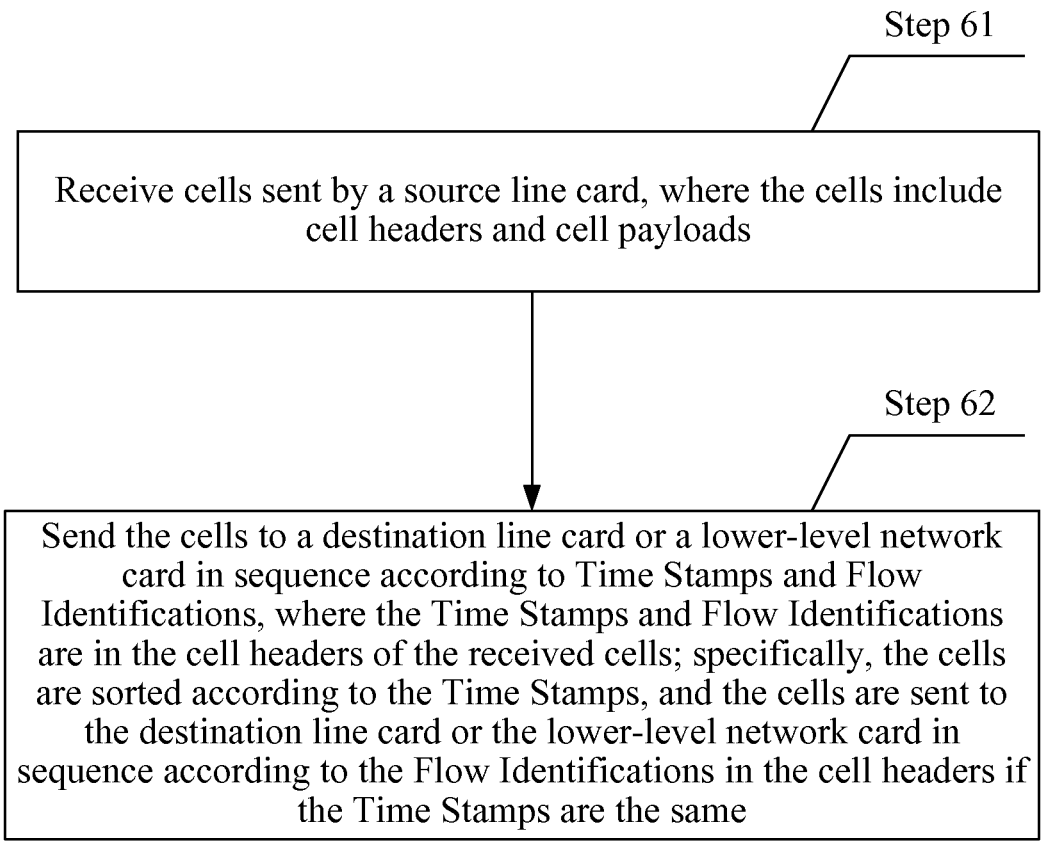
FIG. 6 is another schematic flow chart of a cell processing method in a switching network according to an embodiment of the present invention.

An embodiment of the present invention further provides a cell processing method in a switching network. As shown in FIG. 6, the method includes:

Step 61: Receive cells sent by a source line card, where the cells include cell headers and cell payloads.

A structural allocation situation of a cell is as shown in FIG. 4 (1). A bit allocation situation of a Time Stamp, a Flow Identification, another field, and a cell payload that are in the cell header is indicated in the figure, the numbers of the allocated bits may vary, and the figure is only an example taken for illustration.

Step 62: Send the cells to a destination line card or a lower-level network card in sequence according to Time Stamps and Flow Identifications, where the Time Stamps and Flow Identifications are in the cell headers of the received cells. Specifically, the cells are sorted according to the Time Stamps. If the Time Stamps are the same, the cells are sent to the destination line card or the lower-level network card in sequence according to the Flow Identifications in the cell headers.

Specifically, the Time Stamps are used to mark local time when the source line card sends the cells. The Flow Identifications are used to mark different data streams. A data stream may generally include information of source and destination line cards of a data packet and Quality of Service (QOS). Each data stream that is required to keep a sequence has a unique flow number in a system. In the embodiment of the present invention, a same Flow Identification indicates that source line cards of a data packet are the same and destination line cards of the data packet are also the same. For example, in FIG. 2, if a Time Stamp of a cell C2 is 237, Time Stamps of a cell C1 and a cell C3 are 240, Flow Identifications of the cell C1 and the cell C2 are 11, and the Flow Identification of the cell C3 is 21, an S2(2) sorts the cell C2 to 1, and sorts the cells C1 and C3 to 2 according to the Time Stamps 237 and 240. At this time, the cell C1 and the cell C3 have the same Time Stamp, so that sorting is further performed according to the Flow Identifications. Specifically, the cell C2 whose Flow Identification is 11 is sent to the destination line card or the lower-level network card first, then the cell C1 whose Flow Identification is 11 is sent to the destination line card or the lower-level network card, and finally the cell C3 whose Flow Identification is 21 is sent to the destination line card or the lower-level network card, thus solving an out-of-order problem occurring at the S2(2), making the cells, obtained by the destination line card or the lower-level network card, have the same sequence as an output sequence of an input port, distinguishing cells from different source line cards, and improving reliability of the switching network.

Optionally, if the structural allocation situation of the cell is as shown in FIG. 4 (2), where the cell header further includes a Sequence Number and a Cell Size, in step 62, if the Time Stamps in the cell headers are the same and the Flow Identifications in the cell headers are also the same, the cells are sent to the destination line card or the lower-level network card in sequence according to Sequence Numbers in the cell headers. For example, a data packet is divided into a cell C1 and a cell C2, a Sequence Number 1 is inserted into the cell header of the cell C1, a Sequence Number 2 is inserted into the cell header of the cell C2, and the cells C1 and C2 are sent to the same destination line card through the same source line card at the same time. The cells C1 and C2 have both the same Time Stamps and the same Flow Identifications, so that if the network card sends the cells C1 and C2 to the destination line card directly without sorting the cells C1 and C2, the destination line card needs to use two packet assemblers to perform packet assembling on the cells C1 and C2. However, if the network card sorts the cells C1 and C2 according to the Sequence Numbers of the cells C1 and C2 and then sends the cells C1 and C2 to the destination line card, the destination line card can perform the packet assembling directly without using any additional packet assembler. In this way, a workload on the destination line card may be decreased, and efficiency of the system may be increased.

Optionally, further the network card or the destination line card may clearly know the Cell Size according to the length information in the cell header, determine that the cell is of a fixed length or variable length, and particularly facilitate extension design of a large volume switching network by supporting a data packet to be segmented into one or more cells of different lengths.

Before step 61, the method may further include step 60: sending a synchronization cell or a data cell carrying time synchronization information to the source line card. The synchronization cell and the time synchronization information may include time information of the network card and delay information of a transmission path.

Specifically, in FIG. 2 of the embodiment of the present invention, an S2(1) may be specified as a master network card, the S2(2), an S1/3(1), and an S1/3(2) may be specified as slave network cards, and an FIC1 and an FIC2 are source line cards. First, the master network card sends a synchronization cell or a data cell carrying time synchronization information to the slave network cards, so as to achieve synchronization with each slave network card. Then, the slave network cards send a synchronization cell or a data cell carrying time synchronization information to the source line cards, so as to achieve synchronization between the slave network cards and the source line cards, and further achieve synchronization between the master network card and the source line cards. Once the master network card S2(1) fails or is removed, the slave network card S2(2) upgrades to be the master network card. If only the network card S1 exists, the S1 sends a synchronization cell or a data cell carrying time synchronization information to the source line cards, so as to achieve synchronization between the network card and the source line cards. In actual application, the line card is much more likely to be replaced, upgraded, or removed than the network card, so that in the embodiment of the present invention, the source line cards are synchronized according to local time of the network card, thus improving reliability of the system.

Figure 7:
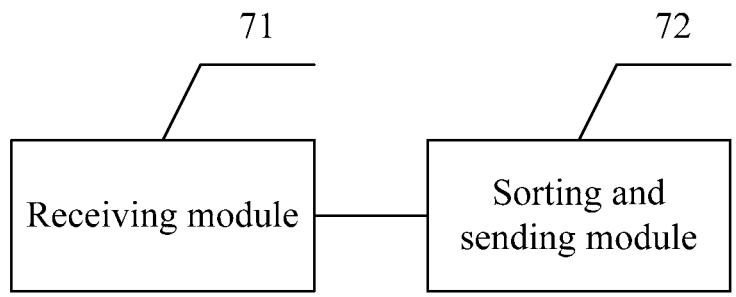
FIG. 7 is a schematic structural diagram of a network card in a switching network according to an embodiment of the present invention.

An embodiment of the present invention further provides a network card in a switching network. The network card may be a mutually-independent switching chip or switching unit, and may generally be divided into three levels, that is, as shown in FIG. 2, switching units of three levels S1, S2, and S3. As shown in FIG. 7, the network card includes: sorting and sending module A receiving module 71 is configured to receive cells sent by a source line card, where the cells include cell headers and cell payloads.

A structural allocation situation of a cell is as shown in FIG. 4 (1). A bit allocation situation of a Time Stamp, a Flow Identification, another field, and a cell payload that are in the cell headers is indicated in the figure, the numbers of the allocated bits may vary, and the figure is only an example taken for illustration.

A sorting and sending module 72 is configured to send the cells to a destination line card or a lower-level network card in sequence according to Time Stamps and Flow Identifications, where the Time Stamps and Flow Identifications are in the cell headers of the cells received by the receiving module 71. Specifically, the cells are sorted according to the Time Stamps. If the Time Stamps are the same, the cells are sent to the destination line card or the lower-level network card in sequence according to the Flow Identifications in the cell headers.

Specifically, the Time Stamps are used to mark local time when the source line card sends the cells. The Flow Identifications are used to mark different data streams. A data stream may generally include information of source and destination line cards of a data packet and Quality of Service (QOS). Each data stream that is required to keep a sequence has a unique flow number in a system. In the embodiment of the present invention, a same Flow Identification indicates that source line cards of a data packet are the same and destination line cards of the data packet are also the same. For example, in FIG. 2, if a Time Stamp of a cell C2 is 237, Time Stamps of a cell C1 and a cell C3 are 240, Flow Identifications of the cell C1 and the cell C2 are 11, and a Flow Identification of the cell C3 is 21, an S2(2) sorts the cell C2 to 1, and sorts the cells C1 and C3 to 2 according to the Time Stamps 237 and 240. At this time, the cell C1 and the cell C3 have the same Time Stamp, so that sorting is further performed according to the Flow Identifications. Specifically, the cell C2 whose Flow Identification is 11 is sent to the destination line card or the lower-level network card first, then the cell C1 whose Flow Identification is 11 is sent to the destination line card or the lower-level network card, and finally the cell C3 whose Flow Identification is 21 is sent to the destination line card or the lower-level network card, thus solving an out-of-order problem occurring at the S2(2), making the cells, obtained by the destination line card or the lower-level network card, have the same sequence as an output sequence of an input port, distinguishing cells from different source line cards, and improving reliability of the switching network.

Optionally, if the structural allocation situation of the cell is as shown in FIG. 4 (2), where the cell header further includes a Sequence Number and a Cell Size, the sorting and sending module 72 is configured to send the cells to the destination line card or the lower-level network card in sequence according to Sequence Numbers in the cell headers if the Time Stamps in the cell headers are the same and the Flow Identifications in the cell headers are also the same. For example, a data packet is divided into a cell C1 and a cell C2, a Sequence Number 1 is inserted into the cell header of the cell C1, a Sequence Number 2 is inserted into the cell header of the cell C2, and the cells C1 and C2 are sent to a network card through the same source line card at the same time. The cells C1 and C2 have both the same Time Stamps and the same Flow Identifications, so that if the network card sends the cells C1 and C2 to the destination line card directly without sorting the cells C1 and C2, the destination line card needs to use two packet assemblers to perform packet assembling on the cells C1 and C2. However, if the network card sorts the cells C1 and C2 according to the Sequence Numbers of the cells C1 and C2 and then sends the cells C1 and C2 to the destination line card, the destination line card can perform the packet assembling directly without using any additional packet assembler. In this way, a workload on the destination line card may be decreased, and efficiency of the system may be increased.

Optionally, further the network card or the destination line card may clearly know the Cell Size according to the length information in the cell header, determine that the cell is of a fixed length or variable length, and particularly facilitate extension design of a large volume switching network by supporting a data packet to be segmented into one or more cells of different lengths.

Before starting the receiving module 71, the method may further include a synchronization module, configured to send a synchronization cell or a data cell carrying time synchronization information to the source line card. The synchronization cell and the time synchronization information may include time information of the network card and delay information of a transmission path.

Specifically, the delay information of the transmission path is used to compensate for an error caused by a path delay in the switching network. In FIG. 2 of the embodiment of the present invention, an S2(1) may be specified as a master network card, the S2(2), an S1/3(1), and an S1/3(2) may be specified as slave network cards, and an FIC1 and an FIC2 are source line cards. First, the master network card sends a synchronization cell or a data cell carrying time synchronization information to the slave network cards, so as to achieve synchronization with the slave network cards. Then, the slave network cards send a synchronization cell or a data cell carrying time synchronization information to the source line cards, so as to achieve synchronization between the slave network cards and the source line cards, and achieve synchronization between the master network card and the source line cards. Once the master network card S2(1) fails or is removed, the slave network card S2(2) upgrades to be the master network card. If only the network card S1 exists, the S1 directly sends a synchronization cell or a data cell carrying time synchronization information to the source line cards, so as to achieve synchronization between the network card and the source line cards. In practice, the line card is much more likely to be replaced, upgraded, or removed than the network card, so that in the embodiment of the present invention, the source line cards are synchronized according to local time of the network card, thus improving reliability of the system.

Figure 8:
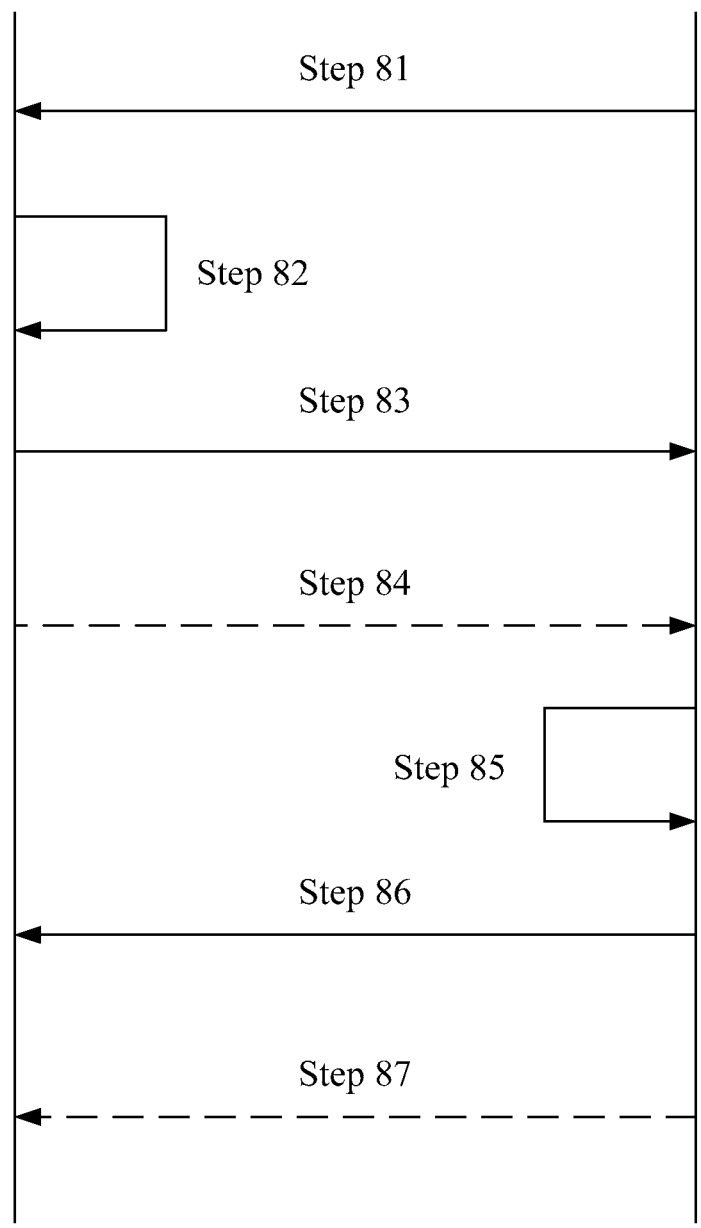
FIG. 8 is a schematic diagram of a cell processing process in a switching network according to an embodiment of the present invention, by taking an example that source line cards are an FIC1 and an FIC2, a network card is an S1, the FIC1 transmits 257-byte and 40-byte data packets, and the FIC2 transmits a 130-byte data packet.

In an embodiment of the present invention, a cell processing process in a switching network is illustrated by taking an example that source line cards are an FIC1 and an FIC2, a network card is an S1, the FIC1 transmits 257-byte and 40-byte data packets, and the FIC2 transmits a 130-byte data packet. As shown in FIG. 8, the cell processing process includes:

Step 81: An S1 sends, based on local time, a synchronization cell to an FIC1 and an FIC2 periodically or non-periodically, and the FIC1 and the FIC2 update their local time according to the synchronization cell, so as to be synchronized to the S1. The synchronization cell includes a Time Stamp and a path delay. The path delay is used to compensate for an error caused by different paths between switching network devices, so as to improve accuracy of the synchronization. In some cases where requirements on the synchronization are not high, the synchronization cell may only include the Time Stamp.

The foregoing step may be replaced with: An S1 sends, based on local time, a data cell to an FIC1 and an FIC2 periodically or non-periodically, and the FIC1 and the FIC2 update their local time according to time synchronization information (a Time Stamp and a path delay) carried by the data cell, so as to be synchronized to the S1. The path delay in the time synchronization information carried by the data cell is used to compensate for an error caused by different paths between switching network devices, so as to improve accuracy of the synchronization. In some cases where requirements on the synchronization are not high, the time synchronization information carried in the data cell may only include the Time Stamp.

Step 82: The FIC1 segments a 257-byte data packet into two cells of 128 bytes and 129 bytes, the FIC1 encapsulates a 40-byte data packet into a 64-byte cell, and the FIC2 encapsulates a 130-byte data packet into a 130-byte cell.

In the foregoing step, the situation is that a Cell Size is between 64 bytes and 256 bytes. The FIC1 may also segment a 257-byte data packet into two cells of 64 bytes and 193 bytes, may also segment a 257-byte data packet into three 64-byte cells and one 65-byte cell, and may also segment a 257-byte data packet into five 64-byte cells. The FIC2 may also segment 130 bytes into two 65-byte cells.

Step 83: The FIC1 inserts a Time Stamp (for example, output time 255) and a Flow Identification (for example 11) into cell headers of a 128-byte cell and a 129-byte cell; The FIC1 inserts a Time Stamp (for example, output time 262) and a Flow Identification (for example 12) into a cell header of the 64-byte cell; the FIC2 inserts a Time Stamp (for example, output time 225) and a Flow Identification (for example 21) into a cell of the 130-byte cell; and the FIC1 and the FIC2 send the marked cells to the S1.

Optionally, in step 84, the FIC1 inserts a cell number 1 and/or a Cell Size 128 into the cell header of the 128-byte cell; the FIC1 inserts a cell number 2 and/or a Cell Size 129 into the cell header of the 129-byte cell; the FIC1 inserts a cell number 1 and/or a Cell Size 64 into the cell header of the 64-byte cell; the FIC2 inserts a cell number 1 and/or a Cell Size 130 into the cell header of the 130-byte cell; and the FIC1 and the FIC2 send the marked cells to the S1.

Step 85: The S1 receives the cells sent by the FIC1 and the FIC2, where the cells include cell headers and cell payloads.

Step 86: The S1 sorts the cells according to the Time Stamps in the cell headers of the received cells. Specifically, Time Stamps in the cell headers of the 128-byte, 129-byte, and 130-byte cells are all 225, and only the Time Stamp in the cell header of the 64-byte cell is 262, so that the 64-byte cell is the last one to be sent to a destination line card or a lower-level network card (for example, an FIC3 or an S2). The S1 sorts the 128-byte, 129-byte, and 130-byte cells according to the Flow Identifications in the cell headers. Specifically, the Flow Identifications of the 128-byte and 129-byte cells are 11, and only the Flow Identification of the 130-byte cell is 21, so that it is distinguished that the 130-byte cell comes from a data stream different from a data stream from which the 128-byte and 129-byte cells come. Therefore, the 128-byte and 129-byte cells are sent to the destination line card or the lower-level network card (for example, the FIC3 or the S2) first, and then the 130-byte cell is sent to the destination line card or the lower-level network card (for example, the FIC3 or the S2).

Further, the destination line card is required to perform packet assembling on the received 128-byte and 129-byte cells, the sequence between which is unknown, so that the destination line card needs to use two packet assemblers to perform the packet assembling on the cells respectively, so as to perform data packet reassembling. For example, the destination line card receives N (N is smaller than or equal to 32) cells that have the same Time Stamp and the same Flow Identification, so that the destination line card needs to use N packet assemblers to perform the packet assembling on the cells respectively.

Optionally, if the method includes step 84, the method includes step 87: According to the cell numbers 1 and 2 that are included in the cell headers of the 128-byte and 129-byte cells, sort the cells, and then send the sorted cells to the destination line card or the lower-level network card (for example, the FIC3 or the S2). That is, the 128-byte cell is sent to the destination line card or the lower-level network card (for example, the FIC3 or the S2) first, and then the 129-byte cell is sent to the destination line card or the lower-level network card (for example, the FIC3 or the S2).

Specifically, if step 87 is included, the destination line card may reassemble the data packets automatically according to the cell numbers without using any packet assembler, and performs the packet assembling according to the sequence of the cells numbers of the 128-byte and 129-byte cells, that is, reassembles, according to the cell numbers, a data packet, in which the 128-byte cell is before the 129-byte cell.

The embodiment of the present invention includes at least one source line card and at least one network card. The network card performs synchronization with the source line card based on local time, thus ensuring high reliability of the system. The network card sorts the cells according to the Time Stamps, the Flow Identifications, the Sequence Numbers, and the Cell Sizes that are inserted into the cell headers by the source line card, so as to ensure that the sequence of the cells obtained by the destination line card is the same as the sequence of the cells output by the source line card, thus easily performing packet reassembling on the data packet, and improving efficiency of the system. Meanwhile, the source line card may segment a data packet into cells of different lengths, which, in some cases, economizes a utilization rate of the cells compared with a method in which a data packet is segmented into cells of a same length.

It should be noted that, in the foregoing source line card and network card embodiments, each included unit or module is only divided according to a logical function, but the present invention is not limited to the foregoing division, as long as a corresponding function can be realized; and a specific name of each unit or module is merely provided for the purpose of distinguishing the units or modules from one another, but not intended to limit the scope of the present invention.

Additionally, persons of ordinary skill in the art should understand that, all of or part of the steps in the foregoing method embodiments may be implemented by a program instructing relevant hardware. The corresponding program may be stored in a computer readable storage medium. The storage medium may be a read-only memory, a magnetic disk, or an optical disk.

The foregoing descriptions are merely exemplary embodiments of the present invention, but not intended to limit the protection scope of the present invention. All variations or substitutions that may be easily figured out by those skilled in the art within the technical scopes disclosed in the embodiments of the present invention should fall within the protection scope of the present invention. Therefore, the protection scope of the invention is subject to the protection scope of the claims.

What is claimed is:

1. A cell processing method in a switching network, comprising:
    segmenting a data packet in a data stream into one or more cells of a same length, or segmenting the data packet in the data stream into one or more cells of different lengths;
    inserting a Time Stamp and a Flow Identification into a cell header of each cell, and sending a marked cell header and a cell payload to a network card, wherein the Time Stamp is configured to mark local time when a source line card sends the cell, and the Flow Identification is configured to mark different data streams; and
    before the segmenting the data packet, updating local time according to time synchronization information carried in a received synchronization cell or data cell sent by the network card, so as to be synchronized to the network card with respect to time, wherein the synchronization cell or the time synchronization information comprises time information of the network card and delay information of a transmission path.

2. The cell processing method in a switching network according to claim 1, further comprising:
    inserting a Sequence Number or a Cell Size into the cell header of each cell, wherein the Sequence Number is a serial number of a cell of a same data packet.

3. A source line card in a switching network, comprising:
    a segmenting unit, configured to segment a data packet in a data stream into one or more cells of a same length, or segment the data packet in the data stream into one or more cells of different lengths;
    a marking unit, configured to insert a Time Stamp and a Flow Identification into a cell header of each cell after segmentation of the segmenting unit, wherein the Time Stamp is configured to mark local time when a source line card sends the cell, and the Flow Identification is configured to mark different data streams;

a sending unit, configured to send the cell header marked by the marking unit and a cell payload to a network card; and a receiving unit, configured to receive time synchronization information carried in a synchronization cell or data cell sent by the network card, wherein the synchronization cell or the time synchronization information comprises time information of the network card and delay information of a transmission path; and a synchronization unit, configured to update local time according to the synchronization cell or time synchronization information before the data packet is segmented, wherein the synchronization cell or time synchronization information is received by the receiving unit, so as to be synchronized to the network card with respect to time.

4. The source line card according to claim 3, wherein the marking unit is further configured to insert a Sequence Number or a Cell Size into the cell header of each cell, wherein the Sequence Number is a serial number of a cell of a same data packet.

5. A cell processing method in a switching network, comprising:

receiving cells sent by a source line card or an upper-level network card, wherein the cells comprise cell headers and cell payloads;

sending the cells to a destination line card or a lower-level network card in sequence according to Time Stamps and Flow Identifications, wherein the Time Stamps and Flow Identifications are in the cell headers of each of the received cells, the Time Stamp is configured to mark local time when the source line card sends the cell, the Flow Identification is configured to mark different data streams, the cells are sorted according to the Time Stamps, and the cells are sent to the destination line card or the lower-level network card in sequence according to the Flow Identifications in the cell headers if the Time Stamps are the same; and sending a synchronization cell or a data cell carrying time synchronization information to the source line card, wherein the synchronization cell or the time synchronization information comprises time information of the network card and delay information of a transmission path.

6. The cell processing method in a switching network according to claim 5, wherein the cell header further comprises a Sequence Number, the cells are sent to the destination line card or the lower-level network card in sequence according to the Sequence Numbers if the Time Stamps in the cell headers are the same and the Flow Identifications in the cell headers are also the same, and the Sequence Number is a serial number of a cell of a same data packet.

7. A network card in a switching network, comprising:

a receiving module, configured to receive cells sent by a source line card or an upper-level network card, wherein the cells comprise cell headers and cell payloads;

a sorting and sending module, configured to send the cells to a destination line card or a lower-level network card in sequence according to Time Stamps and Flow Identifications, wherein the Time Stamps and Flow Identifications are in each of the cell headers received by the receiving module, the Time Stamps are configured to mark local time when the source line card sends the cells, and the Flow Identifications are configured to mark different data streams; specifically, the cells are sorted according to the Time Stamps, and the cells are sent to the destination line card or the lower-level network card in sequence according to the Flow Identifications in the cell headers if the Time Stamps are the same; and a synchronization module, configured to send a synchronization cell or a data cell carrying time synchronization information to the source line card, wherein the synchronization cell or the time synchronization information comprises time information of the network card and delay information of a transmission path.

8. The network card according to claim 7, wherein the cell header further comprises a Sequence Number, the sorting and sending module is further configured to send the cells to the destination line card or the lower-level network card in sequence according to Sequence Numbers if the Time Stamps in the cell headers are the same and the Flow Identifications in the cell headers are also the same, and the Sequence Numbers are serial numbers of the cells of the same data packet.

* * * * *